United States Patent Office 3,539,364
Patented Nov. 10, 1970

3,539,364
CONTAINER FILLER OF IMPROVED STRENGTH AND UNIFORMITY
George E. Haddeland, Mill Valley, Calif.
(224 Ryan Way, South San Francisco, Calif. 94080)
No Drawing. Continuation-in-part of application Ser. No. 476,149, July 30, 1965. This application May 9, 1966, Ser. No. 548,373
Int. Cl. C04b 7/34
U.S. Cl. 106—120     3 Claims

ABSTRACT OF THE DISCLOSURE

A filler composition for gas cylinders consisting essentially of asbestos, charcoal, lime, and silica. The silica is a blend of ground sand and diatomaceous earth in a ratio which provides an optimum relationship between viscosity and crushing strength of the filler composition. The silica to lime ratio is approximately 1.6–2.4. The water to solids ratio is approximately 3.5–3.8, and the lime is preliminarily hydrated in water initially heated to a temperature above 180° F.

---

This invention relates to a filler composition for containers adapted for storing gas, such as acetylene, and to a method for preparing the composition and filling containers therewith. More particularly, the invention provides an improved filler composition and method of preparation characterized by high crushing strength together with uniformity of the finished material.

This is a continuation-in-part of co-pending patent application Ser. No. 476,149, filed July 30, 1965, now abandoned.

The new filler achieves a uniformity of composition and strength not exhibited by previously available products. These significant advantages are achieved without the addition of supplementary ingredients such as suspending or dispersion agents and without the necessity for using specialized techniques in the manufacturing process, such as passing the filler components through a colloid mill. In brief, in the preferred embodiment, the present filler composition consists essentially of asbestos, charcoal, lime and silica. The silica is a blend of ground sand and diatomaceous earth with the proportion of ground sand to diatomaceous earth being selected for optimum viscosity of the mix during cylinder filling and optimum crushing strength of the hardened end product. Because of the optimum viscosity, formation of air created voids or pockets within the filler is avoided and a high crushing strength in the end product is thereby made possible.

The use of a blend of materials for the silica component is only one reason for the beneficial nature of the end product. Thus, it has been discovered that when the lime used in the formula is hydrated by its addition to water maintained at temperatures above about 180° F. and preferably maintained close to boiling throughout the balance of the addition step, a composition having exceptionally low solids settling and high uniformity can be obtained.

The blended silica technique and the control of the water temperature used for the hydration of the lime each independently contribute to the desired goal of reducing the settling of solids in the filled cylinder end product. They may be used independently of each other in the preparation of such a product and substantial improvements along these lines will be obtained. In the preferred case both aspects of the invention will be used and an optimum product can be expected.

To understand the significance of the present invention, it is helpful to point out that some gases and particularly acetylene gas, are unstable at pressures in excess of 15 p.s.i.g. In order to transport acetylene gas, for example, it must be dissolved under pressure in acetone and carried in cylinders of appropriate strength and construction. To prevent violent decomposition of the acetylene gas above the acetone level, the cylinder must be filled with a porous, absorbent material having minute individual pores. The acetone and acetylene gas are carried within these pores. To be effective the filler material must be substantially free of voids and have little or no space between the outer filler surface and the inside walls of the container. If this is not so, space for acetylene gas to collect separated from the acetone carrier would exist creating a decomposition hazard. Further, and at the same time, the filler must have adequate strength and physical resistance so that it does not crack, crumble or settle with normal handling of the acetylene cylinder. Otherwise decomposition problems could be encountered for similar reasons.

Prior art fillers have been generally made using cement or a lime-silica mixture as the bonding agent together with asbestos, charcoal and/or other materials to provide the requisite porosity, absorptive capacity, resilience and strengths. To prepare the filled cylinder such a mixture has been suspended in an aqueous slurry and thereafter poured into the cylinder in slurry form. Elevated temperatures and/or pressure are conventionally applied to the cylinders to harden and set the suspended mass. Water is then evaporated leaving a porous, uniform, monolithic filler inside the cylinder. As is understood, porosity of the filler is determined primarily by the quantity of water used in preparing the slurry and also, but to a lesser extent, by the proportion and types of suspended solids in the filler.

It is most important to filler uniformity that the wet slurries be easily flowable into the cylinder without entrapping air and forming voids or pockets within the filler material. It is known that voids can be minimized by applying a vacuum to the cylinder as it is filled and by vibrating the cylinder. Both operations tend to displace air pockets to the top of the cylinder and thence out of the cylinder.

Viscosity of the mix used in filling the cylinder has a great bearing upon the success with which voids and pockets of entrapped air can be avoided. The lower the mix viscosity the easier the filling operation becomes and the more complete is the separation of entrapped gases. On the other hand, as the mix viscosity is reduced, it becomes more difficult to maintain the mix solids in a homogeneous suspension with the result that too much settling occurs and parts of the finished filler composition do not perform as required.

Two approaches have been taken to arrive at a suitable filling viscosity with reduced settling problems. Where a blend of two types of silica such as herein utilized has been employed, it has been the practice to include suspending agents, such as aluminum sulfate or bentonite to the mix. While these materials may achieve the desired uniformity of composition, they do not contribute to the strength of the filler since they are not bonded into the lime-silica matrix. Bentonite tends to positively weaken the structure of the filler. Moreover, gel type suspending agents may plug fittings of the cylinders and other equipment when the water content is driven off and the gel is dried out.

Another approach is to utilize a colloid mill for purposes of achieving a very fine average particle dimension. Where this technique is employed with a mix in which ground sand is used as the sole source of silica, a relatively high crushing strength end product may be achieved. Such a material prepared in this way can approach the requisite uniformity and lack of settling. However, a colloid mill is costly and in any event, unduly complicates the manufacturing process and necessarily increases the cost of the end product.

The present invention achieves the lack of settling, uniformity of composition of the end product and significantly increased crushing strength while avoiding the necessity of any suspending agents or special equipment or techniques, such as the use of a colloid mill to grind the lime in the preparative process. The end product has all of the desired attributes and can be made at relatively low cost. As previously mentioned these attributes are provided by two modifications in the steps of preparing filler masses. In one aspect of this invention the lime hydrating water temperature is regulated. In the other aspect of the invention the goal is attained by blending a proportion of diatomaceous earth with ground silica so that a thickening action in the filler mix through absorption of free water in the pores of the diatomaceous earth occurs. In this way suspending agents are dispensed with. Control of the amount of diatomaceous earth blended with the ground sand lends sufficient fluidity to the mix for easily flowing into the cylinders with negligible air entrapment and void formation. At the same time, a sufficient proportion of ground sand is present to provide high crushing strength.

The improvement in filler crushing strength is achieved where the proportion of ground sand or silica is maintained reasonably high. Preferably the blend of ground silica to diatomaceous earth or kieselguhr is such that the ground sand is about 50–90% by weight of the blend. Excellent results are achieved where the ground sand is about 60–80% by weight of the blend. Although increased crushing strength is proportional to increased concentration of ground sand, the present invention is based upon the discovery that 100% ground silica as the silica component is undesirable because the extent of settling and uniformity of the mix is unfavorably disturbed.

Thus, this invention contemplates the use of a blend of the two types of silica noted although over a wide range of proportions depending upon the precise end properties desired. Increasing the concentration of the low density, highly porous diatomaceous earth lowers viscosity while increasing the proportion of the high density non-porous ground sand increases crushing strength. Within the specific proportions above noted, optimum compositions are generally achieved. But in all cases a blend including an effective proportion of each of the two types of silica is critical to avoidance of the various stabilizing techniques previously considered necessary.

When an optimum product is sought, the other aspect of the invention may be employed in addition to the silica blend to achieve an exceptionally high degree of uniformity and lack of settling in the filler composition. This aspect of the invention has reference to the step of hydrating the lime prior to mixing it with the other ingredients of the composition. Heretofore no special criticality has been placed upon the temperature of the water used in the hydration with the result that relatively low temperatures on the order of 120° F. have been used. It has now been discovered that the hydrataing water to which the lime is added should be above about 180° F. when the addition is commenced. As the lime addition proceeds, the temperature of the hydrating water should be maintained close to boiling while the balance of the lime in the formula is added thereto and hydrated. If these temperature limitations are observed, an excellent uniformity of product is achieved. As noted the temperature of the lime hydration water has been discovered to be so influential upon the character of the end product that even in the absence of the blend of silica discussed above its incorporation into the manufacturing process will lead to substantially improved products in terms of uniformity and absence of settling of the porous filler mass.

Apart from blending the two types of silica, absence of suspending agents and colloidal grinding, and the temperature adjustment in the lime hydration step, the invention is consistent with prior techniques as to ingredients employed, amounts, and general preparative steps. Thus, the filler composition is essentially a combination of silica, lime and asbestos. Where desired, charcoal can be included in the composition since it is sometimes considered as functioning to provide a swelling action with acetone which further tightens the filler within the cylinder shell. However, it is possible to produce satisfactorily filled cylinders without the charcoal with the other three ingredients alone.

As before, the water to solids ratio is relatively critical and is preferably maintained at a ratio of about 3.5 to 3.8 for proper porosity in the end product. A water to solids ratio of about 3.64 appears to be optimum for many purposes. The silica to lime ratio is also important, and is preferably maintianed between about 1.6 to 2.4 with excellent results achieved in the range of about 1.8 to 2.0. Where these water to solids and silica to lime ratios are observed, the remaining components can be varied as desired. Thus, the asbestos content can be varied to obtain the desired flexibility in the end product, and as mentioned above, charcoal can be eliminated altogether.

To illustrate the present invention, a filler formula composed of the following elements was formulated.

| | Weight percent |
|---|---|
| Asbestos | 18.5 |
| Charcoal | 12.5 |
| Silica | 44.0 |
| Quick lime | 25.0 |
| | 100.0 |

In accordance with the present discovery, the silica content of the formula was prepared from ground sand (95% minus 200 mesh) and diatomaceous earth wherein the ground sand constituted 70% by weight of the two silicas.

A filler is prepared in accordance with the following steps. The charcoal is soaked under vacuum to saturate it with water prior to addition to the mix. Quick lime is added to water maintained over 180° F. Sufficient water is used in the hydrating of the lime to prepare a 14.5% hydrated lime suspension. As the lime is added to the water, the temperature of the water is maintained close to boiling. The presoaked charcoal, hydrated lime suspension and 25 more gallons of water are then combined with the silica blend and asbestos. Total water used in the process is as follows:

| | Gallons | Pounds |
|---|---|---|
| Charcoal saturation | 2 | 16 |
| Quick lime water | 18 | 150 |
| Free Water | 25 | 208 |
| Total | 45 | 374 |

Ratio of water to solids in the filler was 3.64.

The solids are added to the free water in the order shown and mixed for one-half hour before filling into cylinder shells. Filling of the cylinder shells is accomplished in conventional manner with vacuum and vibration as desired.

For comparison, another cylinder was filled with a composition under the procedure described above with the exception that instead of a blend of silica, a composition in which the silica was 100% diatomaceous earth was used. After the filled cylinders were indurated, hardened, and set in conventional fashion the fillers were compared. The filler prepared from the blend of ground silica and diatomaceous earth had a smooth surface and a crushing strength of 425 p.s.i. The filler prepared from 100% diatomaceous earth had a rough surface and a crushing strength of anly 325 p.s.i.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A filler composition for gas cylinders consisting essentially of asbestos, charcoal, lime water, and silica, said silica being a blend of ground sand and diatomaceous earth wherein the ground sand is 60–80% by weight of the blend, the silica to lime ratio being approximately 1.6–2.4 by weight, the water to solids ratio of the filler being approximately 3.5–3.8, and wherein said lime has been preliminarily hydrated in water initially heated to a temperature above 180° F.

2. An improved method for preparing a filled cylinder for the storage of acetylene gas under pressure comprising hydrating lime by adding a first portion of the lime to water at a temperature of at least above 180° F, maintaining the water close to boiling while adding the balance of lime thereto, mixing the hydrated lime with asbestos and a blend of silica derived from ground sand and diatomaceous earth, the ground sand being 60–80% of the blend to provide an optimum relationship between viscosity in the mixture for uniformly filling empty cylinders therewith and crushing strength of the composition after hardening, the silica to lime ratio of the composition being about 1.6–2.4 and the water to solids ratio being about 3.5–3.8, filling cylinders with said composition, and indurating the filler in the container, the silica blend proportions and lime hydrating conditions serving to substantially prevent settling of the solids thereby yielding a uniform filler composition.

3. A method for preparing a filler composition for a cylinder in which acetylene gas is to be stored under pressure comprising: hydrating lime by adding a first portion of the lime to water at a temperature of at least above 180° F., maintaining the water close to boiling while adding the balance of lime thereto, and mixing the hydrated lime with asbestos and a blend of ground sand and diatomaceous earth wherein the ground sand constitutes 60–80% by weight of the blend, the blend to lime ratio of the composition being 1.6–2.4 and the water to solids ratio being 3.5–3.8.

References Cited
UNITED STATES PATENTS

| | | | |
|---|---|---|---|
| 2,422,251 | 6/1947 | O'Brien et al. | 206—0.7 |
| 2,883,040 | 4/1959 | Pater et al. | 206—0.7 |
| 2,944,911 | 7/1960 | Muller et al. | 106—120 |
| 3,274,123 | 9/1966 | Coyne et al. | 252—446 |

JAMES E. POER, Primary Examiner

U.S. Cl. X.R.

206—.7; 252—446